United States Patent
Uematsu et al.

(10) Patent No.: US 12,206,460 B2
(45) Date of Patent: Jan. 21, 2025

(54) OPTICAL NETWORK SYSTEM, OPERATING METHOD OF OPTICAL NETWORK SYSTEM, AND OPTICAL LINE TERMINATOR

(71) Applicant: NIPPON TELEGRAPH AND TELEPHONE CORPORATION, Tokyo (JP)

(72) Inventors: Takui Uematsu, Musashino (JP); Hidenobu Hirota, Musashino (JP); Hiroyuki Iida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 104 days.

(21) Appl. No.: 18/014,283

(22) PCT Filed: Jul. 9, 2020

(86) PCT No.: PCT/JP2020/026804
§ 371 (c)(1),
(2) Date: Jan. 3, 2023

(87) PCT Pub. No.: WO2022/009367
PCT Pub. Date: Jan. 13, 2022

(65) Prior Publication Data
US 2023/0269005 A1     Aug. 24, 2023

(51) Int. Cl.
*H04B 10/80*     (2013.01)
*H04B 10/278*    (2013.01)

(52) U.S. Cl.
CPC ......... *H04B 10/807* (2013.01); *H04B 10/278* (2013.01)

(58) Field of Classification Search
None
See application file for complete search history.

(56) References Cited

U.S. PATENT DOCUMENTS 4,346,478 A * 8/1982 Sichling ............... H04B 14/026
250/227.21
2012/0148241 A1   6/2012 Piehler et al.

FOREIGN PATENT DOCUMENTS

| JP | S57121794 A | | 7/1982 |
| JP | 01118815 A | * | 5/1989 |

(Continued)

OTHER PUBLICATIONS

Takui Uematsu et al., "Study on optical fiber coupler using side-polishing method", IEICE Technical Report, vol. 119, No. 223, 2019.

*Primary Examiner* — David W Lambert

(57) ABSTRACT

An object of the present invention is to provide an optical network system with high electric power efficiency, an operation method thereof, and an optical line terminal device capable of realizing the same.
An optical network system (301) according to the present invention is a bus wiring type optical network system and includes an optical line terminal device (11*a*) which transmits optical signals (Ls), an optical multiplexer/demultiplexer circuit (12) which inputs some of the optical signals (Ls) to an optical bus core wire (50), and a photoelectric conversion unit (13) which converts the other of the optical signals (Ls) into electric power. The optical network system (301) can effectively utilize the electric power by reusing the electric power wasted in a port (Tf) of an optical fiber coupler.

13 Claims, 6 Drawing Sheets

(56) References Cited

FOREIGN PATENT DOCUMENTS

| | | | |
|---|---|---|---|
| JP | H01118815 A | | 5/1989 |
| JP | 2013106290 A | * | 5/2013 |
| JP | 2014502798 A | | 2/2014 |

* cited by examiner

OPTICAL NETWORK SYSTEM, OPERATING METHOD OF OPTICAL NETWORK SYSTEM, AND OPTICAL LINE TERMINATOR

CROSS-REFERENCE TO RELATED APPLICATIONS

This application is a 371 U.S. National Phase of International Application No. PCT/JP2020/026804, filed on Jul. 9, 2020. The entire disclosure of the above application is incorporated herein by reference.

TECHNICAL FIELD

The present disclosure relates to a bus wiring type optical network system, an operation method thereof, and an optical line terminal device included in the same.

BACKGROUND ART

FIG. 1 is a diagram for explaining a bus wiring type optical network system 300. The optical network system 300 is constructed by installing an optical multiplexer/demultiplexer circuit 12 and an optical line terminal device 11 on a subscriber side for an optical bus core wire 50 extending from an optical line terminal device 10 on a communication carrier side in accordance with needs. For this reason, since the number of optical fiber core wires can be reduced as compared with a star type wiring method including GE-PON (IEEE802.3ah) in the related art, an optical network can be economically constructed.

In the optical multiplexer/demultiplexer circuit 12, for example, a method in which a side surface polishing method is used has been studied as a method for preparing an optical multiplexer/demultiplexer circuit which is non-destructive and has a low insertion loss with respect to a current optical fiber core wire (optical bus core wire) (Non Patent Literature 1). According to the above technique, it is possible to perform optical multiplexing/demultiplexing without cutting a current optical fiber core wire and this can be realized in-service for subscribers.

CITATION LIST

Non Patent Literature

Non Patent Literature 1: Uematsu and the like, "Basic Study of Optical Branching Using Side Surface Polishing Method," IEICE Technical Report, vol. 119, no. 223, OFT2019-36, pp. 23-26, October 2019.

SUMMARY OF INVENTION

Technical Problem

Here, in an optical network in which N optical line terminal devices 11 are connected to one optical bus core wire 50, for example, it can be considered that the optical fiber coupler described in Non Patent Literature 1 be used as the optical multiplexer/demultiplexer circuit 12 as illustrated in FIG. 2. In this case, since the N optical line terminal devices (N is an integer of 2 or more) divide an optical signal Ls transmitted from the optical line terminal device on the communication carrier side, the optical multiplexer/demultiplexer circuit is connected with a branching ratio of 1/N (for example, about 3% when N=32). For this reason, in the optical multiplexer/demultiplexer circuit 12, 1/N (for example, about 3% when N=32) of light Lsa from the optical signal Ls output from the optical line terminal device 11 on the subscriber side is multiplexed on the optical bus core wire 50 and reaches the optical line terminal device 10 on the communication carrier side, but 1−1/N (for example, about 97% when N=32) of light Lsb is transmitted through the optical bus core wire 50 without being multiplexed and reaches a port Tf to which the optical line terminal device 11 is not connected. The light Lsb reaching the port Tf is absorbed by a terminator or the like. For this reason, if the optical line terminal device 11 is connected to the optical bus core wire 50 by the optical multiplexer/demultiplexer circuit 12 of the optical fiber coupler, the electric power efficiency is low (about 3% at N=32). That is to say, an optical network system in which an optical multiplexer/demultiplexer circuit of an optical fiber coupler is used has a problem that it is difficult to increase electric power efficiency.

Therefore, in order to solve the above problems, an object of the present invention is to provide an optical network system with high electric power efficiency, an operation method thereof, and an optical line terminal device capable of realizing the same.

Solution to Problem

In order to achieve the above object, an optical network system according to the present invention reuses electric power of an optical signal transmitted without being multiplexed with an optical bus core wire from an optical signal transmitted from an optical line terminal device on a subscriber side, thereby improving electric power efficiency.

Specifically, an optical network system according to the present invention is a bus wiring type optical network system including: an optical line terminal device which transmits optical signals; an optical multiplexer/demultiplexer circuit which inputs some of the optical signals to an optical bus core wire; and a photoelectric conversion unit which converts others of the optical signals into electric power.

Furthermore, a method for operating an optical network system according to the present invention is a method for operating a bus wiring type optical network system, the method including: inputting some of optical signals transmitted by an optical line terminal device to an optical bus core wire; and converting others of the optical signals into electric power.

Furthermore, an optical line terminal device according to the present invention is an optical line terminal device connected to an optical bus core wire of a bus wiring type optical network system, the optical line terminal device including: an optical transceiver which receives optical signals from the optical bus core wire and transmit optical signals to the optical bus core wire; and a photoelectric conversion unit which converts, into electric power, an optical signal which has not been input to the optical bus core wire among the transmitted optical signals.

This optical network system can reuse power of an optical signal transmitted without being multiplexed on an optical bus core wire as electric power and can improve electric power efficiency. Therefore, the present invention can provide an optical network system with high electric power efficiency, an operation method thereof, and an optical line terminal device capable of realizing the same.

Here, the optical line terminal device of the optical network system according to the present invention may use the electric power for driving the optical line terminal device itself.

In addition, the optical network system according to the present invention may use the electric power to drive a sensing device or a switching device.

Furthermore, the optical network system according to the present invention may further include an electric power storage unit which stores the electric power.

Note that the above inventions can be combined as far as possible.

Advantageous Effects of Invention

The present invention can provide an optical network system with high electric power efficiency, an operation method thereof, and an optical line terminal device capable of realizing the same.

DESCRIPTION OF EMBODIMENTS

Figure 1:
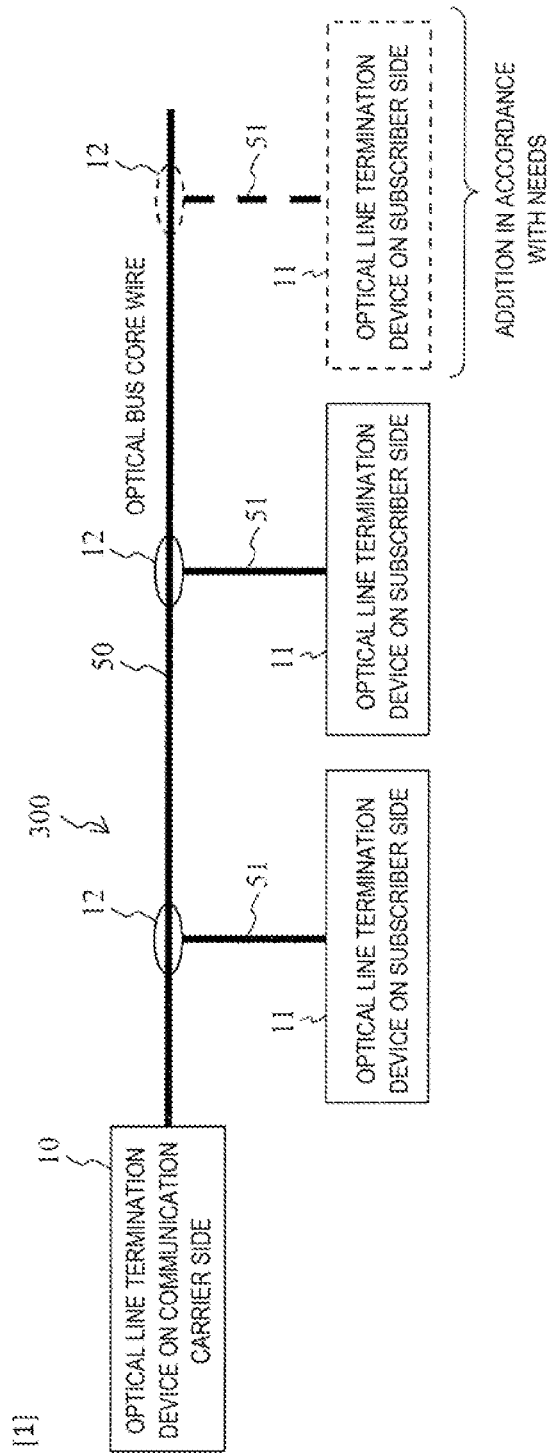
FIG. 1 is a diagram for explaining a bus wiring type optical network system.

Embodiments of the present invention will be described with reference to the accompanying drawings. The embodiments which will be described below are examples of the present invention and the present invention is not limited to the following embodiments. Note that constituent elements having the same reference numerals in the present specification and the drawings indicate the same constituent elements.

First Embodiment

Figure 3:
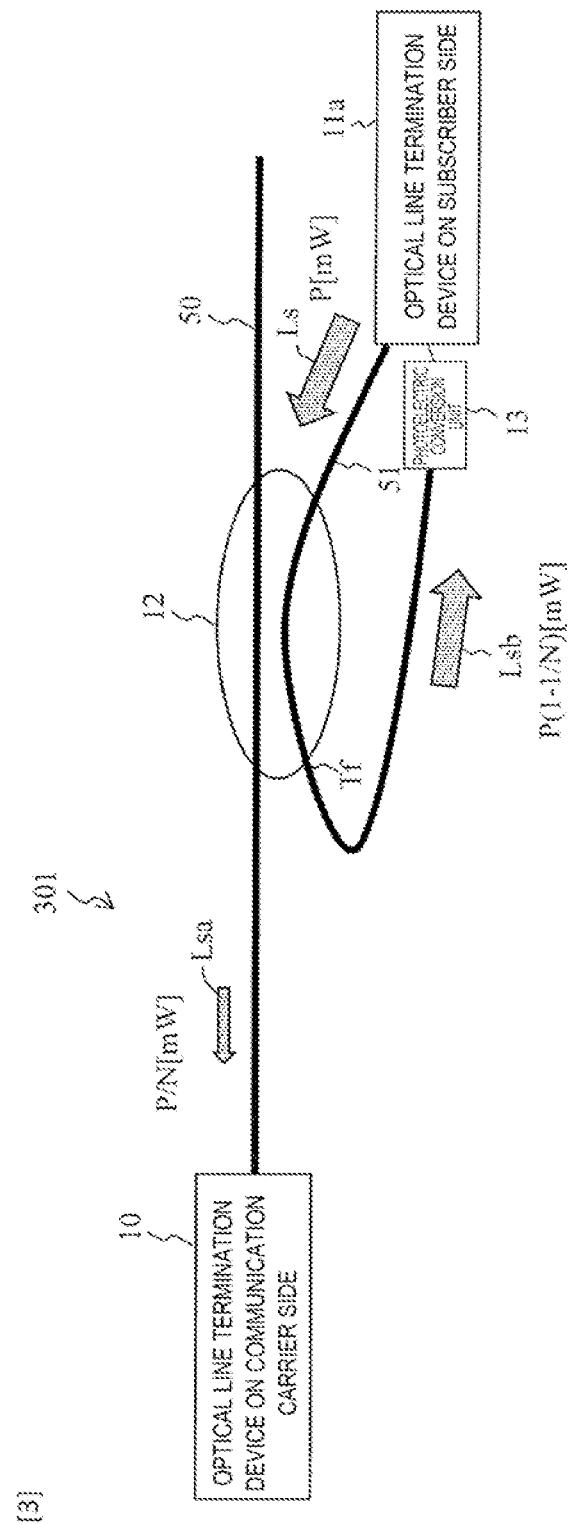
FIG. 3 is a diagram for explaining an optical network system according to the present invention.

FIG. 3 is a diagram illustrating an optical network system 301 of this embodiment. The optical network system 301 is a bus wiring type optical network system, including:
an optical line terminal device 11a which transmits an optical signal Ls;
an optical multiplexer/demultiplexer circuit 12 which inputs some Lsa of the optical signal Ls to an optical bus core wire 50; and
a photoelectric conversion unit 13 which converts the rest Lsb of the optical signal Ls into electric power.

Figure 2:
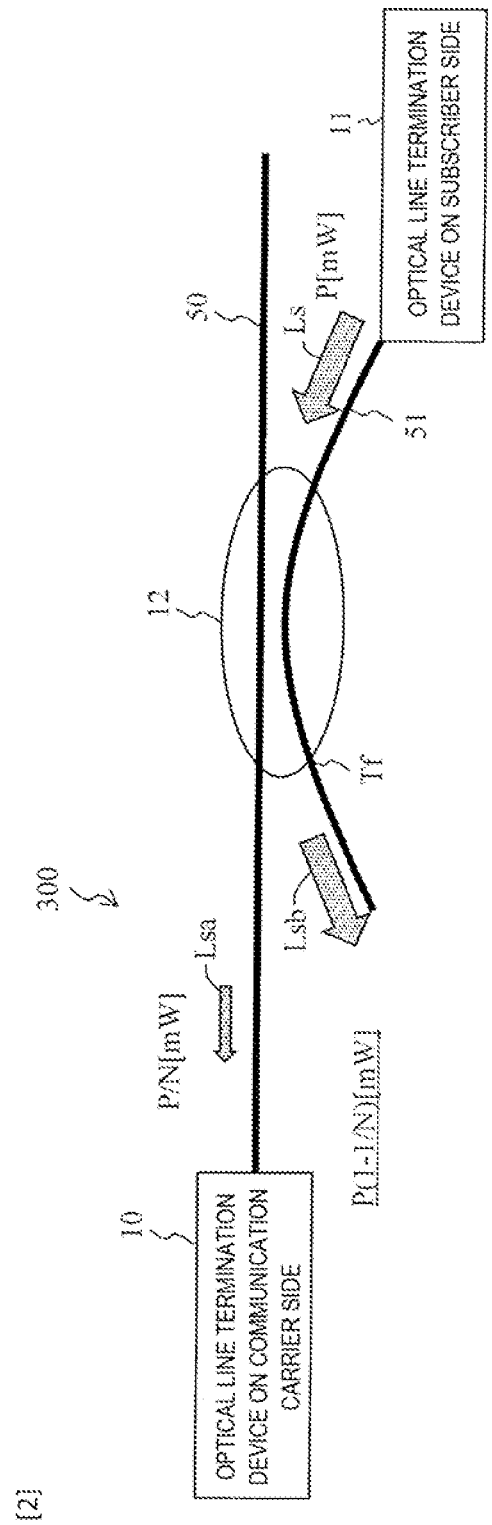
FIG. 2 is a view for explaining a problem of the present invention.

The optical multiplexer/demultiplexer circuit 12 is, for example, the optical fiber coupler described with reference to FIG. 2.

The optical network system 301 collects an optical signal Lsb having an intensity P (1−1/N) [mW] transmitted to a port Tf without being multiplexed on the optical bus core wire 50 in the optical multiplexer/demultiplexer circuit 12 from the optical signal Ls having an intensity P [mW] transmitted from the optical line terminal device 11a on a subscriber side. Also, the photoelectric conversion unit 13 converts the collected optical signal Lsb into electric power and the electric power is used again by the optical line terminal device 11a or the like. That is to say, the optical network system 301 can effectively utilize the electric power by reusing the electric power wasted in the port Tf of the optical fiber coupler.

Note that, of the optical signals Ls, the optical signal Lsa having the intensity P/N [mW] is multiplexed on the optical bus core wire 50 and reaches the optical line terminal device 10 on a communication carrier side.

The optical network system 301 can reduce electric power supplied from the outside to the optical line terminal device 11a or the like by P(1−1/N) [mW] by using the electric power again as compared with the optical network system 300. For example, in the case of the general GE-PON method (P=0.5 [mW], N=32), a reduction amount is 0.48 [mW] and it is possible to reduce electric power by up to about 15.3 [kWh] per one network in one year.

Second Embodiment

Figure 4:
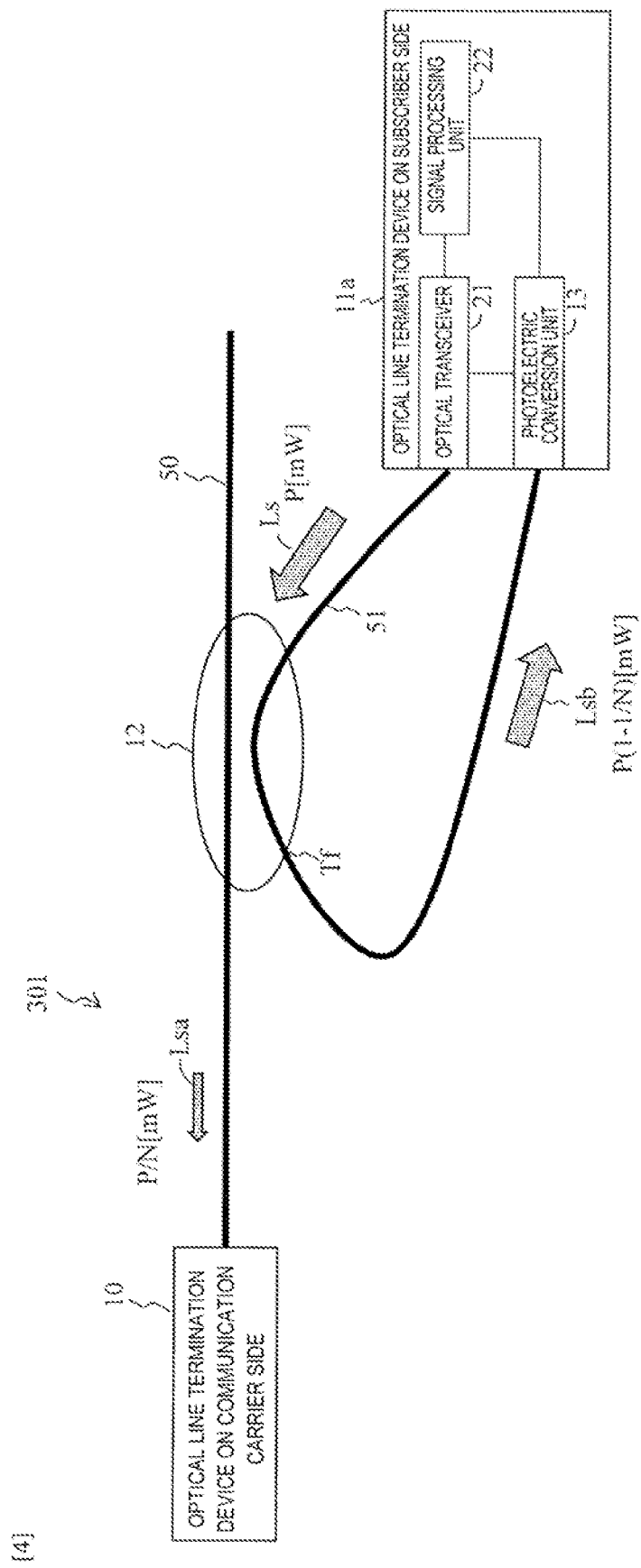
FIG. 4 is a diagram for explaining the optical network system according to the present invention.

FIG. 4 is a diagram for explaining a structure of an optical line terminal device 11a according to this embodiment. The optical line terminal device 11a is an optical line terminal device connected to an optical bus core wire 50 of a bus wiring type optical network system, including:
an optical transceiver 21 which receives an optical signal from the optical bus core wire 50 and transmits optical signals Ls to the optical bus core wire 50; and
a photoelectric conversion unit 13 which converts, into electric power, an optical signal Lsb which has not been input to the optical bus core wire 50 among the transmitted optical signals Ls.

Note that, of the optical signals Ls, the optical signal Lsa having the intensity P/N [mW] is multiplexed on the optical bus core wire 50 and reaches the optical line terminal device 10 on a communication carrier side.

In this embodiment, the optical line terminal device 11a incorporates the photoelectric conversion unit 13 described in the first embodiment. Also, the optical line terminal device 11a also includes a signal processing unit 22 which processes the optical signal received by the optical transceiver 21 and the optical signal Ls transmitted by the optical transceiver 21.

The optical transceiver 21 and the signal processing unit 22 are an optical transceiver and a signal processing unit which are also included in the optical line terminal device 11 in the related art described with reference to FIG. 2. In addition to this, the optical line terminal device 11a newly includes a photoelectric conversion unit 13. Of the optical signals Ls transmitted from the optical transceiver 21 of the optical line terminal device 11a, the photoelectric conversion unit 13 receives an optical signal Lsb transmitted to the port Tf without being multiplexed on the optical bus core wire 50 in the optical multiplexer/demultiplexer circuit 12 and converts the received optical signal into electric power. The converted electric power is transmitted to the optical transceiver 21 or the signal processing unit 22 and used again. Therefore, the optical line terminal device 11a can effectively utilize the electric power by reusing the electric power wasted in the port Tf of the optical fiber coupler as described in the first embodiment.

Third Embodiment

Figure 5:
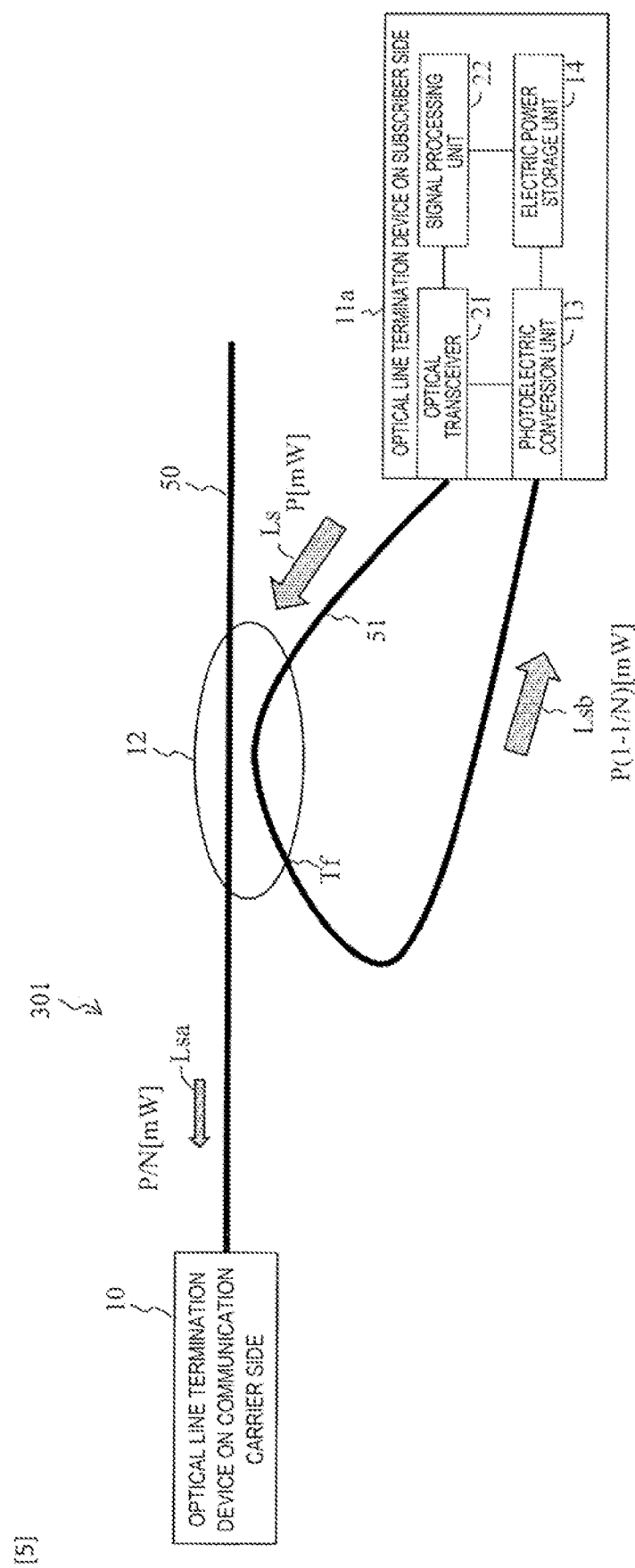
FIG. 5 is a diagram for explaining the optical network system according to the present invention.

FIG. 5 is a diagram for explaining a structure of the optical line terminal device 11a according to this embodiment. The optical line terminal device 11a further includes an electric power storage unit 14 which stores the electric power as compared to the structure described in the second embodiment. In this embodiment, a difference between the second embodiment and the third embodiment, that is, the electric power storage unit 14 will be described.

The optical line terminal device 11a of this embodiment may include the electric power storage unit 14 and store the electric power converted by the photoelectric conversion unit 13. The optical line terminal device 11a of the second embodiment is configured to immediately use the electricity transmitted from the photoelectric conversion unit 13 and the optical line terminal device 11a of this embodiment is configured to store the electric power generated by the photoelectric conversion unit 13 in the electric power storage unit 14 and use the stored electric power at an arbitrary timing. For example, the optical line terminal device 11a of this embodiment can operate even when commercial electric power is interrupted due to a disaster or the like.

Fourth Embodiment

Figure 6:
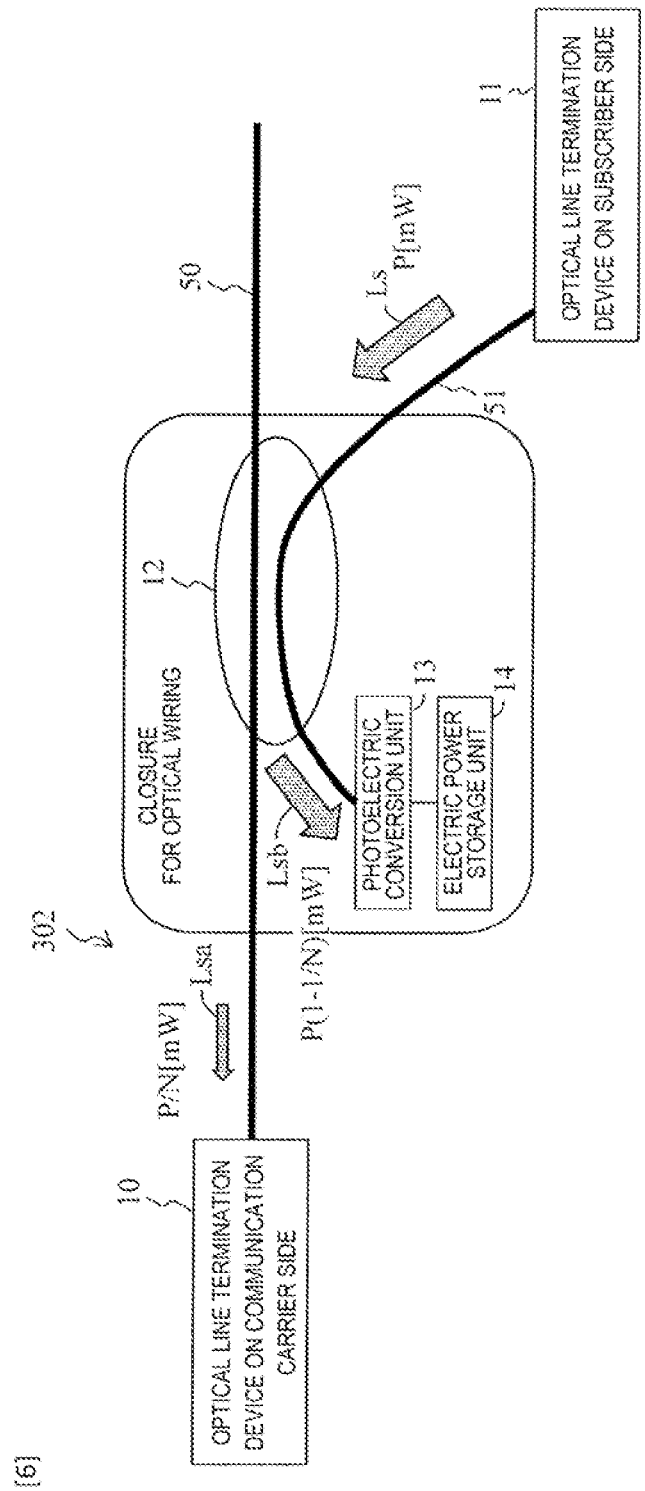
FIG. 6 is a diagram for explaining the optical network system according to the present invention.

FIG. 6 is a diagram for explaining an optical network system 302 of this embodiment. The optical network system 302 is different from the optical network system 301 of FIG. 3 in that the photoelectric conversion unit 13 is near the optical multiplexer/demultiplexer circuit 12 and the optical network system further includes an electric power storage unit 14 which stores the electric power.

The photoelectric conversion unit 13 and the electric power storage unit 14 are not necessarily provided in the optical line terminal device 11a as described in the second and third embodiments and may be provided in the optical multiplexer/demultiplexer circuit 12 or the vicinity thereof (for example, in an optical line closure 15 or in an optical line cabinet).

Since the optical line terminal device on the subscriber side may be the optical line terminal device 11 in the related art instead of the optical line terminal device 11a in the optical network system 302, the introduction cost can be reduced. In addition, the optical network system 302 can use the electric power generated by the photoelectric conversion unit 13 and the electric power stored in the electric power storage unit 14 as electric power of a sensing device, a switching device, or the like.

REFERENCE SIGNS LIST 10 optical line terminal device on communication carrier side
11, 11a optical line terminal device on subscriber side
12 optical multiplexer/demultiplexer circuit
13 photoelectric conversion unit
14 electric power storage unit
15 closure
21 optical transceiver
22 photoelectric conversion unit
50 optical bus core wire
300 to 302 optical network system

The invention claimed is:

1. A bus wiring type optical network system comprising:
a plurality of optical line terminal devices respectively coupling to a single optical bus core wire, the plurality of optical line terminal devices including a first optical line terminal device, a number of the plurality of optical line terminal devices being N, where N is an integer of 2 or more;
an optical fiber coupler configured to:
couple between the first optical line terminal device and the single optical bus core wire;
receive an optical signal from the first optical line terminal device;
provide a first intensity of the optical signal to a communication carrier terminal device via the single optical bus core wire, the first intensity corresponding to 1/N; and
output a second intensity of the optical signal via a port to which any of the plurality of optical line terminal devices is not connected, the second intensity corresponding to 1-1/N; and
a photoelectric converter configured to receive the second intensity of the optical signal from the port of the optical fiber coupler to convert the second intensity of the optical signal into electric power.

2. The optical network system according to claim 1, wherein the first optical line terminal device is configured to use the electric power for driving the first optical line terminal device.

3. The optical network system according to claim 1, further comprising a sensing device or a switching device, wherein the electric power is used to drive the sensing device or the switching device.

4. The optical network system according to claim 1, further comprising an electric power storage configured to store the electric power.

5. The bus wiring type optical network system according to claim 1, wherein
the first optical line terminal device includes the photoelectric converter, and
the first optical line terminal device is configured to:
receive the second intensity of the optical signal from the port of the optical fiber coupler to convert the second intensity of the optical signal into the electric power by the photoelectric converter; and
use the electric power for driving the first optical line terminal device.

6. A method for operating a bus wiring type optical network system, the bus wiring type optical network system having a plurality of optical line terminal devices respectively coupling to a single optical bus core wire, the plurality of optical line terminal devices including a first optical line terminal device, a number of the plurality of optical line terminal devices being N, where N is an integer of 2 or more, the method comprising:
receiving an optical signal from the first optical line terminal device by an optical fiber coupler connecting between the first optical line terminal device and the single optical bus core wire;
providing a first intensity of the optical signal to a communication carrier terminal device via the single optical bus core wire, the first intensity corresponding to 1/N;
outputting a second intensity of the optical signal via a port of the optical fiber coupler to which any of the plurality of optical line terminal devices is not connected, the second intensity corresponding to 1-1/N; and
receiving the second intensity of the optical signal from the port of the optical fiber coupler to convert the second intensity of the optical signal into electric power.

7. The method for operating a bus wiring type optical network system according to claim 6, further comprising:

using the electric power to drive the first optical line terminal device.

8. The method for operating a bus wiring type optical network system according to claim 6, wherein
the bus wiring type optical network system further has a sensing device or a switching device, and
the sensing device or the switching device is driven by the electric power.

9. The method for operating a bus wiring type optical network system according to claim 6, further comprising:
storing the electric power into an electric power storage.

10. The method for operating a bus wiring type optical network system according to claim 6, wherein
the first optical line terminal device includes the photoelectric converter, and
the first optical line terminal device is configured to:
receive the second intensity of the optical signal from the port of the optical fiber coupler to convert the second intensity of the optical signal into the electric power by the photoelectric converter; and
use the electric power for driving the first optical line terminal device.

11. An optical line terminal device connected to a single optical bus core wire of a bus wiring type optical network system, the bus wiring type optical network system having other optical line terminal devices respectively coupling to the single optical bus core wire, a total number of the optical line terminal device and the other optical line terminal devices is N, where N is an integer of 2 or more, the optical line terminal device comprising:
an optical transceiver configured to transmit an optical signal to an optical fiber coupler in which:
a first intensity of the optical signal is provided to a communication carrier terminal device via the single optical bus core wire, the first intensity corresponding to 1/N; and
a second intensity of the optical signal is provided via a port of the optical fiber coupler to which any of the optical line terminal device and the other optical line terminal devices is not connected, the second intensity corresponding to 1-1/N; and
a photoelectric converter configured to receive the second intensity of the optical signal from the port of the optical fiber coupler to convert the second intensity of the optical signal into electric power.

12. The optical line terminal device according to claim 11, wherein the electric power is used to drive the optical line terminal device.

13. The optical line terminal device according to claim 11, further comprising an electric power storage configured to store the electric power.

* * * * *